G. F. VOIGHT.
SPRING SUSPENSION.
APPLICATION FILED MAY 28, 1917.

1,259,685.

Patented Mar. 19, 1918.

Inventor,
George F. Voight.

UNITED STATES PATENT OFFICE.

GEORGE F. VOIGHT, OF SAN FRANCISCO, CALIFORNIA.

SPRING SUSPENSION.

1,259,685.  Specification of Letters Patent.  Patented Mar. 19, 1918.

Application filed May 28, 1917. Serial No. 171,425.

*To all whom it may concern:*

Be it known that I, GEORGE F. VOIGHT, a citizen of the United States, residing at San Francisco, in the county of San Francisco and State of California, have invented certain new and useful Improvements in Spring Suspensions, of which the following is a specification.

My invention relates to a spring suspension for road vehicles, and has for its object the provision of an auxiliary spring to assist the main spring to cushion the vehicle against the unevenness of the road; another object of the invention being to provide such an auxiliary spring that can be operated in connection with an oscillatory lever connected at one end to the vehicle running gear and at the other end to the frame or spring supported portion of the vehicle, the lever acting in the capacity of a rebound snubber to the vehicle; still another object of my invention being to provide an auxiliary spring to work coöperatively with the main spring, and to provide a connection between the said two springs, operable with as little bearing friction as possible.

With the foregoing and other objects in view which will appear as the description proceeds, the invention resides in the combination and arrangement of parts and in the detail of construction hereinafter described and claimed, it being understood that changes in the precise embodiment of the invention herein disclosed can be made within the scope of what is claimed without departing from the spirit of the invention.

Referring to the drawings,—

Figure 1:
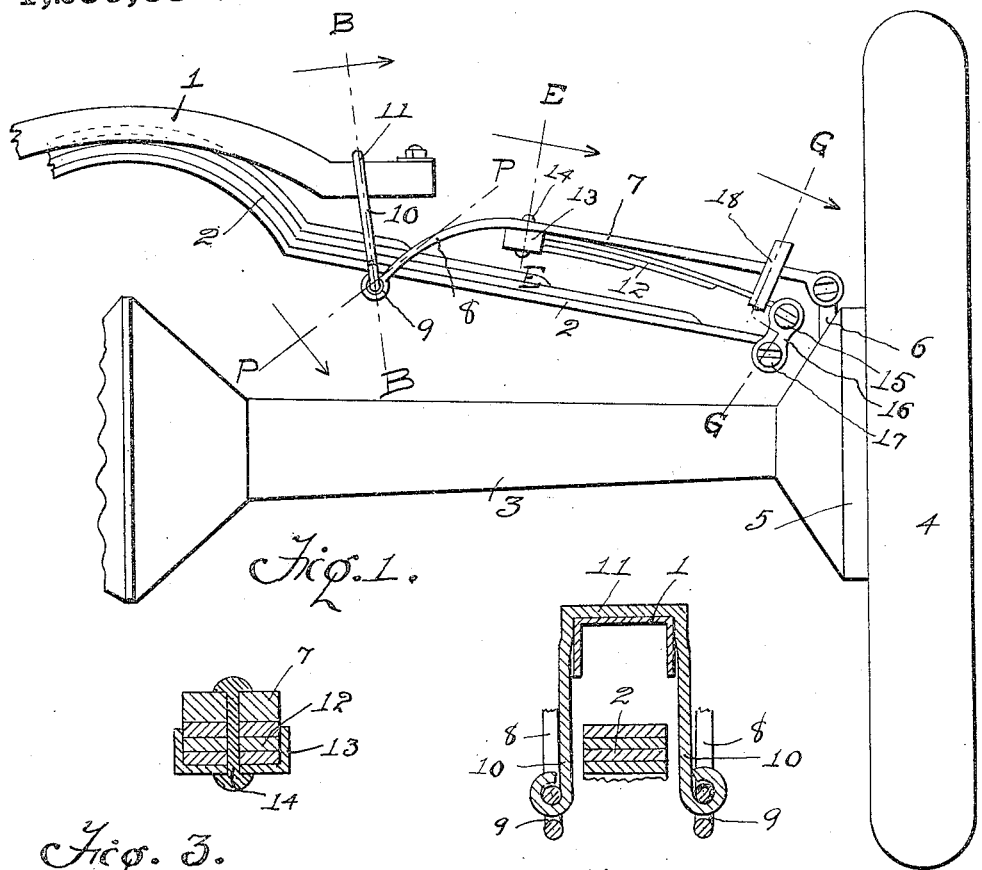
Figure 1 is a rear-end elevation of the right-hand portion of an automobile, the body portion having been removed, with the present invention applied thereto.
Figures 2, 3:
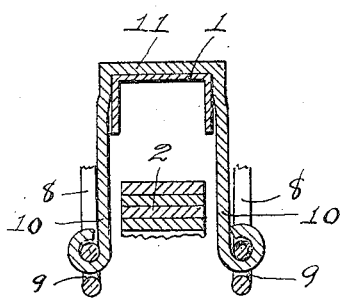
Fig. 2 is a sectional view of a portion of the invention on line B B, Fig. 1, showing also a sectional view of a portion of the vehicle frame, and also a sectional view of a portion of the main spring.
Fig. 3 is a sectional view of the invention on line E E, Fig. 1.
Figures 4, 5:
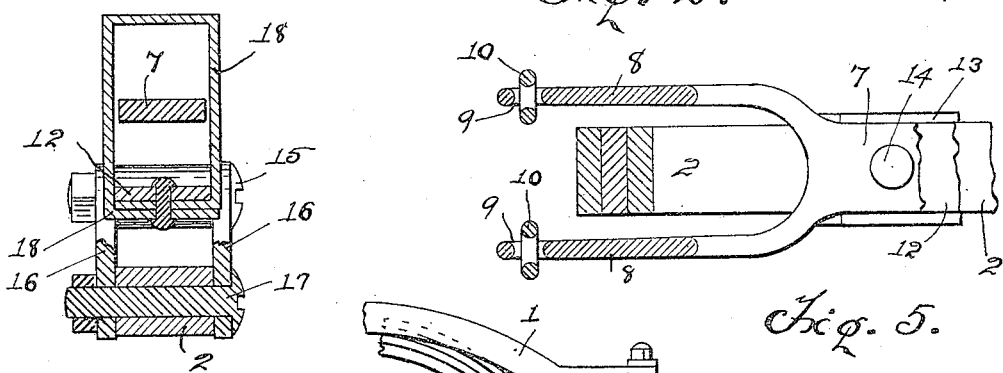
Fig. 4 is a sectional view of a portion of the invention, showing a small portion of the outer end of the main spring, on line G G, Fig. 1.
Fig. 5 is a view taken on line P P, Fig. 1.
Figure 6:
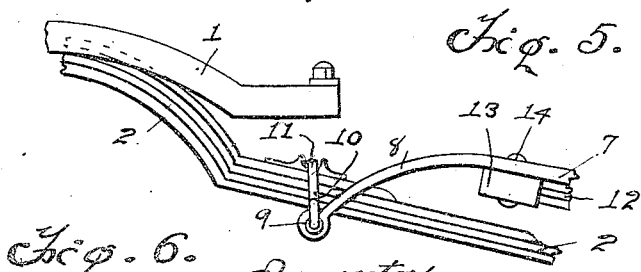
Fig. 6 is a rear end view of a portion of the vehicle frame and the main spring, showing a portion of the present invention connected up therewith in a slightly modified way—the inner end of the lever being connected up with the main spring instead of the frame.

1 designates the vehicle frame, which is resiliently supported by a bowed main leaf spring 2 disposed a suitable distance above and in a general line with an axle 3, which is supported by a wheel 4. Adjacent the outer end of the axle 3 is a brake drum 5. The axle 3 and its brake drum 5 and the wheel 4, comprise a portion of the vehicle running gear. Between the outer end of the main spring 2 and the outer end of the axle 3 and supported by the latter, is an upstanding bracket 6 pivotally supporting the outer end of a lever 7, which extends inwardly or toward the vehicle frame from said bracket, and over-hangs the outer end portion of the main spring 2. The inner end of the lever 7 is forked, however, as shown in Fig. 5, the forked ends 8 8 straddling the main spring from the upper side thereof and terminate in eyes 9 9. Into the eyes 9 9 is disposed the depending hooked ends 10 10 of an inverted stirrup-shaped hanger 11, which hanger supports the inner end, or ends, of the lever 7 by engaging the upper side of the vehicle frame 1. The arms of the hanger 11 are disposed downwardly one on either side of the frame and the main spring. In the modified form shown in Fig. 6, the hanger 11 engages the upper side of the main spring instead of the frame 1 as shown in the preferred form shown in Fig. 1. In the preferred form the inner end of the lever 7 is adapted to move upwardly and downwardly with the upward and downward movements of the vehicle frame or body, while in the modified form the inner end of the lever moves upwardly and downwardly with the upward and downward movements of the main spring at its point of bearing engagement with the hanger 11. The difference in the vertical movements of the inner end of the lever 7, whether it is coupled up with the frame as shown in Fig. 1, or with the main spring as shown in Fig. 6, is very slight, and the down-pull exerted by the lever upon the vehicle body would be practically the same in either case.

To the lower side of the lever 7, adjacent the forked ends 8 8, is rigidly secured the inner end of an elongated auxiliary leaf spring 12, by means of a fastening clip 13 and a pin 14 extending vertically through said clip, through the end of the spring 12 and through the lever 7. While I prefer to build this auxiliary spring 12 up of a plurality of laminations or leaves of different lengths in order to obtain the desired flexibility with the least danger of breakage, if desired, it can be made out of but a single leaf. Through the outer end of the auxiliary spring extends a horizontal opening, through which extends a pivot pin 15, which also extends through the upper ends of the shackle links 16 16, the lower ends of said links being disposed one on either side of an opening extending horizontally through the outer end of the main spring 2, and through both said lower ends of the shackle links and said opening through the outer end of the main spring, is disposed a pivot pin 17. Straddling the lever 7 from the upper side thereof, and supported by and secured to, the auxiliary spring 12 intermediate its ends is a yoke 18 operably engageable with the upper side of the lever 7 for limiting the downward movements of the outer end of said auxiliary spring.

In operation, the auxiliary spring is adapted to resiliently support one end of the main spring, and the auxiliary spring being constructed of lighter materials and more readily deflected against its tension than the main spring, it will yield quickly in operation permitting the wheel 4 to rise over ordinary obstructions without causing the outer end of the main spring to rise up, at the same time any up-throw that may be imparted to the vehicle body by reaction of the main spring, is materially lessened by the down-pull exerted by the inner end of the lever through its nonresilient connection with the vehicle frame or the main spring.

While I have shown in the drawings my invention assembled with the rear right-hand portion of an automobile, it is applicable to the left-hand as well as to the right-hand side, and to the front as well as to the rear of the machine.

Throughout the foregoing specification and the claims following, the term, "inner end" is intended to designate the end nearest the vehicle frame, and the term, "outer end" is intended to designate the end nearest the vehicle wheel.

Having described my invention, I claim,—

1. The combination with a vehicle frame and axle and main leaf spring, of a lever having its outer end pivotally supported by the axle and its inner or free end movably supported, the lever over-hanging the outer end portion of the main spring and extending in a general direction therewith, and a second lever having its inner end rigidly secured to the first mentioned lever adjacent the latter's inner section and its outer end pivotally connected to the outer end of the main spring; the second lever being flexible intermediate its ends and yieldingly supporting the main spring.

2. A spring suspension of the character described, comprising a main leaf spring, an axle, an oscillatory lever pivoted at one end to the axle and having its free end movably supported, a second and flexible lever having one end secured to said oscillatory lever and its free end supporting a connecting element, and a connection between said connecting element and one end of the main leaf spring, the arrangement being such that said flexible lever yieldingly supports said end of said main leaf spring.

3. A spring suspension of the character described, comprising a main leaf spring, an axle, an oscillatory lever pivoted at one end to the axle, a support vertically movable relative to the axle, a connection between the inner or free end of the lever and said support, a flexible lever secured at one end to said oscillatory lever intermediate the ends of the latter, and a connection between the free end of the flexible lever and one end of the main leaf spring, the arrangement being such that the flexible lever may yieldingly support one end of said main leaf spring.

4. A spring suspension of the character described, comprising a main leaf spring, an axle, an oscillatory lever pivoted at one end to the axle, a support vertically movable relative to the axle, a non-resilient connection between the inner or free end of the lever and said support, a flexible lever secured at one end to said oscillatory lever, and a connection between the free end of said flexible lever and one end of the main leaf spring.

5. A spring suspension of the character described, comprising a main leaf spring, an axle, an oscillatory lever pivoted at one end to the axle, a vertically movable support for the other end of the lever, an auxiliary spring comprising a plurality of elongated arms secured at one end to said lever, and a connection between the free end of one of said arms and one end of said main leaf spring, the arrangement being such that the auxiliary spring may yieldingly support one end of said main leaf spring.

6. A spring suspension of the character described, comprising a main leaf spring, an axle, an oscillatory lever pivoted at one end to the axle, a vertically movable support for the other end of the lever, an auxiliary leaf spring secured at one end to said lever intermediate its ends, a connecting element supported by the free end of the auxiliary spring, and a connection between said connecting element and one end of the main leaf spring, the arrangement being such that said auxiliary spring yieldingly supports one end of said main leaf spring.

7. A spring suspension of the character described, comprising a main leaf spring, an axle, an oscillatory lever pivoted at one end to the axle, the free end of the lever terminating in a two-pronged fork, a support vertically movable relative to the axle, a connection between the free ends of said fork and said support, and a connection between the lever intermediate its ends and one end of the main leaf spring.

8. A spring suspension of the character described, comprising a main leaf spring, an axle, an oscillatory lever having one end pivoted to the axle and its free end terminating in two arms forming a fork, the free ends of said arms being disposed one at each side of the main leaf spring so as to be free to move relative thereto, a connection between the free ends of said arms and a support vertically movable relative to the axle, and a connection between the lever intermediate its ends and one end of the main leaf spring.

9. A spring suspension of the character described, comprising a main leaf spring, an axle, an oscillatory lever pivoted at one end to the axle, the free end of the lever terminating in a pair of arms forming a fork, the crotch of the fork being disposed above the main leaf spring, the free ends of the arms of the fork being bent one to each side of the main leaf spring and free to move relative thereto, a connection between the free ends of the arms and a support vertically movable relative to the axle, and a resilient connection between the lever intermediate its ends and one end of the main leaf spring.

10. A spring suspension of the character described, comprising a main leaf spring, an axle, an oscillatory lever having one end pivotally supported by the axle and its free end terminating in a pair of arms forming a fork, the crotch of the fork being disposed above the main leaf spring while the free ends of the arms of the fork are bent one to each side of said spring and are free to move relative thereto, a non-resilient connection between the free ends of said arms and a support vertically movable relative to the axle, and a connection between the lever intermediate its ends and one end of the main leaf spring.

In testimony that I claim the foregoing as my own, I have hereunto affixed my signature.

GEORGE F. VOIGHT.

Copies of this patent may be obtained for five cents each, by addressing the "Commissioner of Patents, Washington, D. C."